United States Patent
Yap et al.

(10) Patent No.: US 8,608,147 B1
(45) Date of Patent: Dec. 17, 2013

(54) WORKPIECE CARRIER

(75) Inventors: Kok Kin Yap, Sungai Petani (MY);
Leong Chuan Diong, Penang (MY)

(73) Assignee: WD Media, LLC, San Jose, CA (US)

( * ) Notice: Subject to any disclaimer, the term of this patent is extended or adjusted under 35 U.S.C. 154(b) by 782 days.

(21) Appl. No.: 12/728,154

(22) Filed: Mar. 19, 2010

(51) Int. Cl.
*B25B 11/00* (2006.01)

(52) U.S. Cl.
USPC .......................................... 269/296; 269/291

(58) Field of Classification Search
USPC ........... 269/296, 291, 309–310; 241/95, 37.5; 83/425, 3; D7/678
See application file for complete search history.

(56) References Cited

U.S. PATENT DOCUMENTS

| | | | | |
|---|---|---|---|---|
| 1,454,579 A | * | 5/1923 | Fitz Patrick | 241/273.1 |
| 2,220,485 A | * | 11/1940 | Kashew | 241/168 |
| 3,948,132 A | * | 4/1976 | Camp | 83/425.3 |
| 5,267,823 A | * | 12/1993 | Roman | 414/412 |
| 7,178,707 B1 | * | 2/2007 | Bokina | 225/38 |
| 2011/0009041 A1 | * | 1/2011 | Spisich et al. | 452/141 |

* cited by examiner

*Primary Examiner* — Lee D Wilson

(57) ABSTRACT

A workpiece carrier including an insert rail having a plurality of teeth, with each of the plurality of teeth having a first beveled upper edge surface.

3 Claims, 6 Drawing Sheets

WORKPIECE CARRIER

TECHNICAL FIELD

Embodiments described herein relate to the field of workpiece processing equipment, more particularly, to a workpiece carrier.

BACKGROUND

During a series of magnetic recording disk manufacturing operations, a disk's surface is exposed to various types of contaminants. Any material present in a manufacturing operation is a potential source of contamination. For example, sources of contamination may include process gases, chemicals, deposition materials, and liquids. The various contaminants may be deposited on the disk's surface in particulate form. If the particulate contamination is not removed, it may interfere with the proper fabrication of a magnetic recording disk. Therefore, it is necessary to clean contamination from the surface of the disk after various stages in the manufacturing process.

Contamination may be removed using a cleaning machine where one or more disks are placed in a disk carrier and submerged in a cleaning tank containing a cleaning liquid in order to remove the particles from the surface of the disk(s). The disks may be rinsed when the carrier is vertically pulled up out of the cleaning solution in the tank with a steam cleaning solution that is sprayed onto the disks during the pulling action. One problem with such a process is that water droplets may remain on the bottom edges of the disks, due to a lack of drying, that can result in stain marks on the surface of the disks.

One conventional type of disk carrier used in the cleaning process has two side rails and a bottom rail that secure the disks within the carrier. FIG. 1A is a cross-sectional view showing the surface of a disk resting between the rails of the disk carrier with: the left side rail contacting the disk at approximately the 9 o'clock position; the right side rail contacting the disk at approximately the 3 o'clock position, and; the bottom rail contacting the disk at approximately the 5 o'clock position (reference to a clock coordinate system on the face of the disk). FIG. 1B illustrates a portion of one of the rails of such a conventional disk carrier. The rail is formed with a saw (a.k.a., shark) tooth pattern on the side contacting the disks. The teeth of the rail have a sloping, flat top surface of about 1 millimeter (mm) thickness, connecting the front and back surfaces of the rail teeth at right angles. Each disks rests between the opposing sloping, top surfaces of adjacent teeth. One problem with such a tooth configuration is that although the top surfaces are sloping, solution droplets may still become trapped on the flat surfaces of the teeth against which the disk rests. Any trapped solution may result in the above noted staining problem.

BRIEF DESCRIPTION OF THE DRAWINGS

Embodiments are illustrated by way of example, and not limitation, in the figures of the accompanying drawings in which.

DETAILED DESCRIPTION

Embodiments of the apparatus and methods are described herein with reference to figures. However, particular embodiments may be practiced without one or more of these specific details, or in combination with other known methods, materials, and apparatuses. In the following description, numerous specific details are set forth, such as specific materials, dimensions and processes parameters etc. to provide a thorough understanding. In other instances, well-known manufacturing processes and equipment have not been described in particular detail to avoid unnecessarily obscuring the claimed subject matter. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment. Furthermore, the particular features, structures, materials, or characteristics may be combined in any suitable manner in one or more embodiments.

Embodiments of a workpiece carrier including an insert rail having a plurality of teeth with each of the plurality of teeth having a first beveled upper edge surface are described. Although embodiments of workpiece carrier may be described with respect to cleaning operations, the workpiece carrier may also be used with other types of operations. Although embodiments of the present invention may, at times, be described in relation to disks, it should be appreciated that the carrier may also be used with other types of workpieces. The term "workpiece" as used herein may include, substrates, semiconductor wafers, photomasks, magnetic recording disks, optical discs, glass substrates, flat panel display surfaces, liquid crystal display surfaces, etc.

Figure 1A:
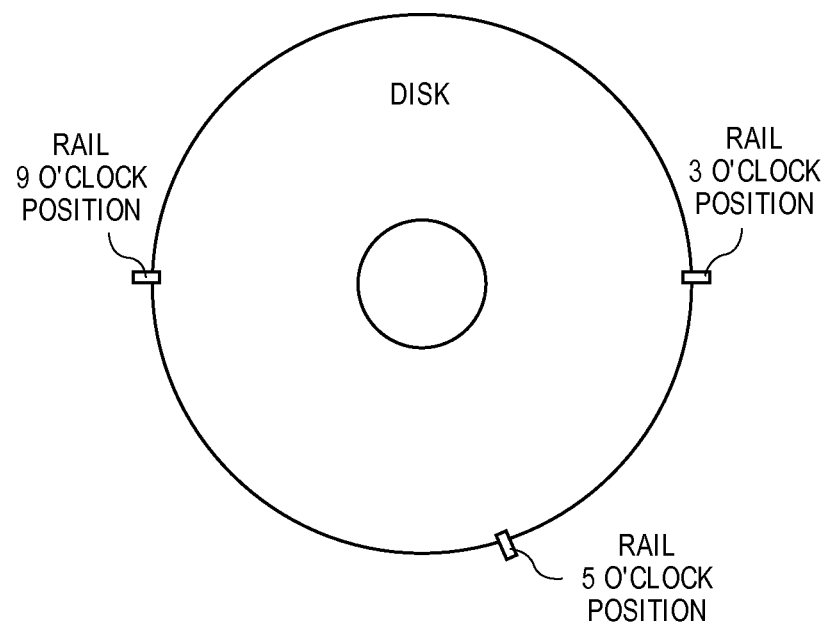
FIG. 1A is a cross-sectional view showing the surface of a disk resting between the rails of a disk carrier.
Figure 2:
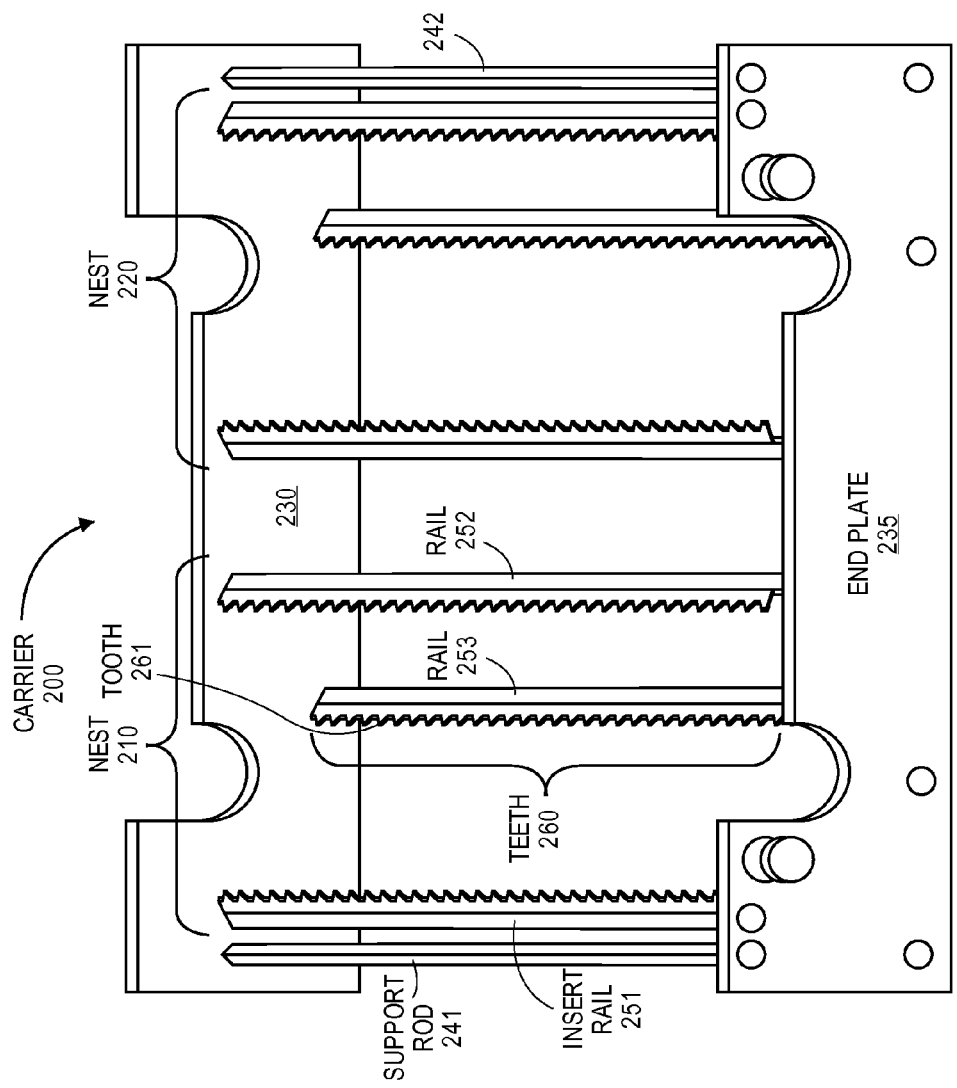
FIG. 2 illustrates a workpiece carrier according to one embodiment of the present invention.

FIG. 2 illustrates a workpiece carrier according to one embodiment of the present invention. In this embodiment, workpiece carrier 200 includes two nests: a first nest 210 and a second nest 220. Alternatively, the workpiece carrier may have more or less than two nests. Each nest is configured to secure one or more workpieces (e.g., a disk) within it using a plurality of insert rails (e.g., three rails as illustrated in FIG. 2) coupled between a first end plate 230 and a second end plate 235. In this particular embodiment, each nest includes three insert rails. For example, nest 210 includes a first side insert rail 251, a second side insert rail 252 and a bottom insert rail 253. The insert rails may be coupled between the end plates such that the first side insert rail 251 contacts a disk at approximately the 9 o'clock position, the second side insert rail 252 contacts the disk at approximately the 3 o'clock position, and the bottom insert rail contacts the disk at approximately the 5 o'clock position (e.g., as shown in FIG. 1A). It should be noted that the contact positions are only exemplary and that the rails may be coupled between the end plates in manner to contact disks at other positions.

Nest 200 may also include additional support rods (e.g., support rods 241 and 242) to connect the end plates 230 and 235 together with further structural support. The insert rails and the support rods are coupled to the end plates 230 and 235 using any type of securing means (soldering, bolting, etc.) well known to those of ordinary skill in the art.

Figure 1B:
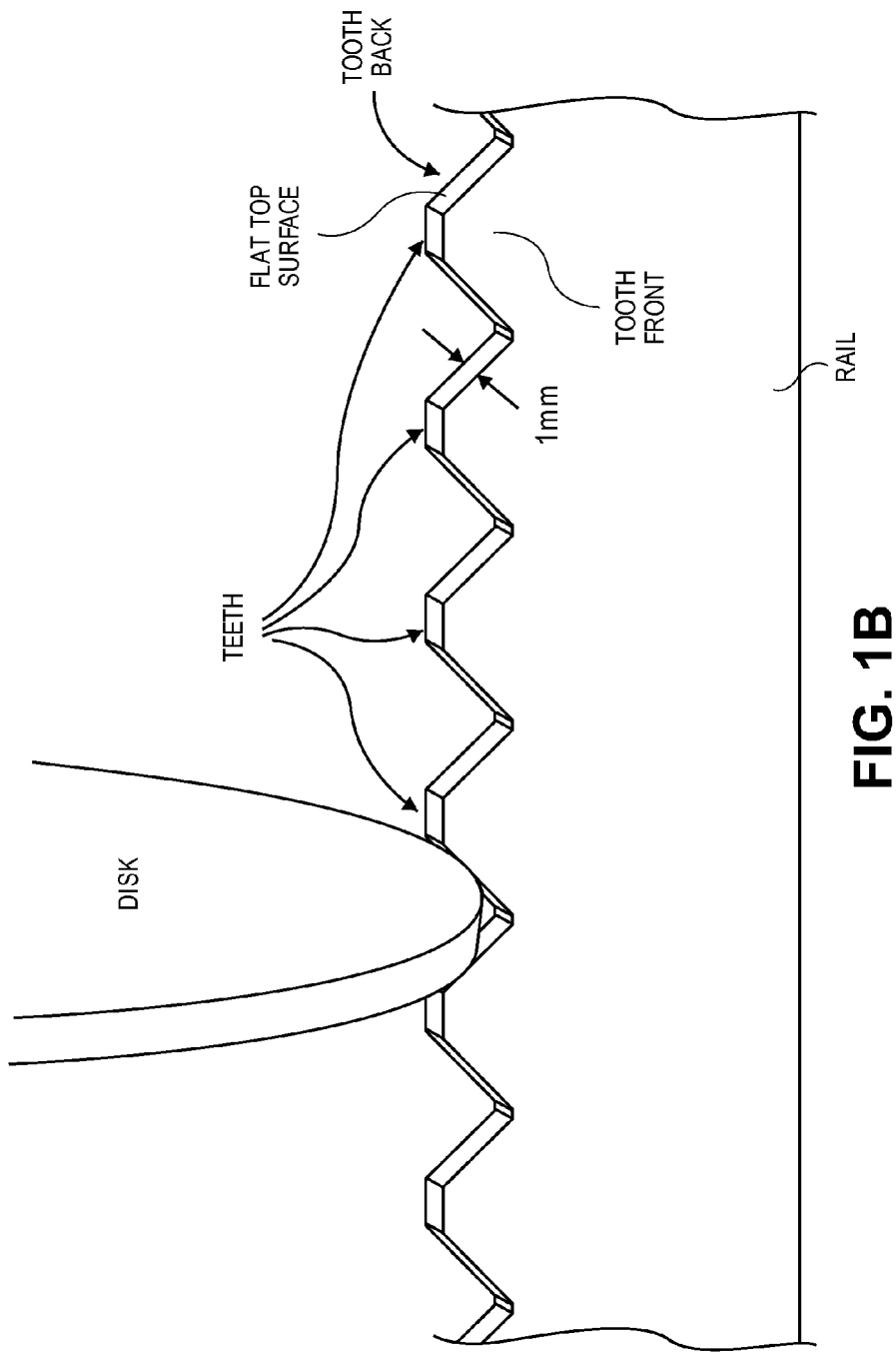
FIG. 1B illustrates a portion of one of the rails of a conventional disk carrier.

In one embodiment, the bottom insert rail 253 has a plurality of teeth 260, wherein each of the plurality of teeth (e.g., tooth 261) has at least one beveled surface as discussed in further detail below. First side insert rail 251 and second side insert rail 252 may also have teeth constructed in a manner similar to that of the teeth of bottom insert rail 253. Alternatively, either or both of first side insert rail 251 and second side insert rail 252 may have teeth constructed in a manner as illustrated in FIG. 1B or may have other configurations.

Figure 3A:
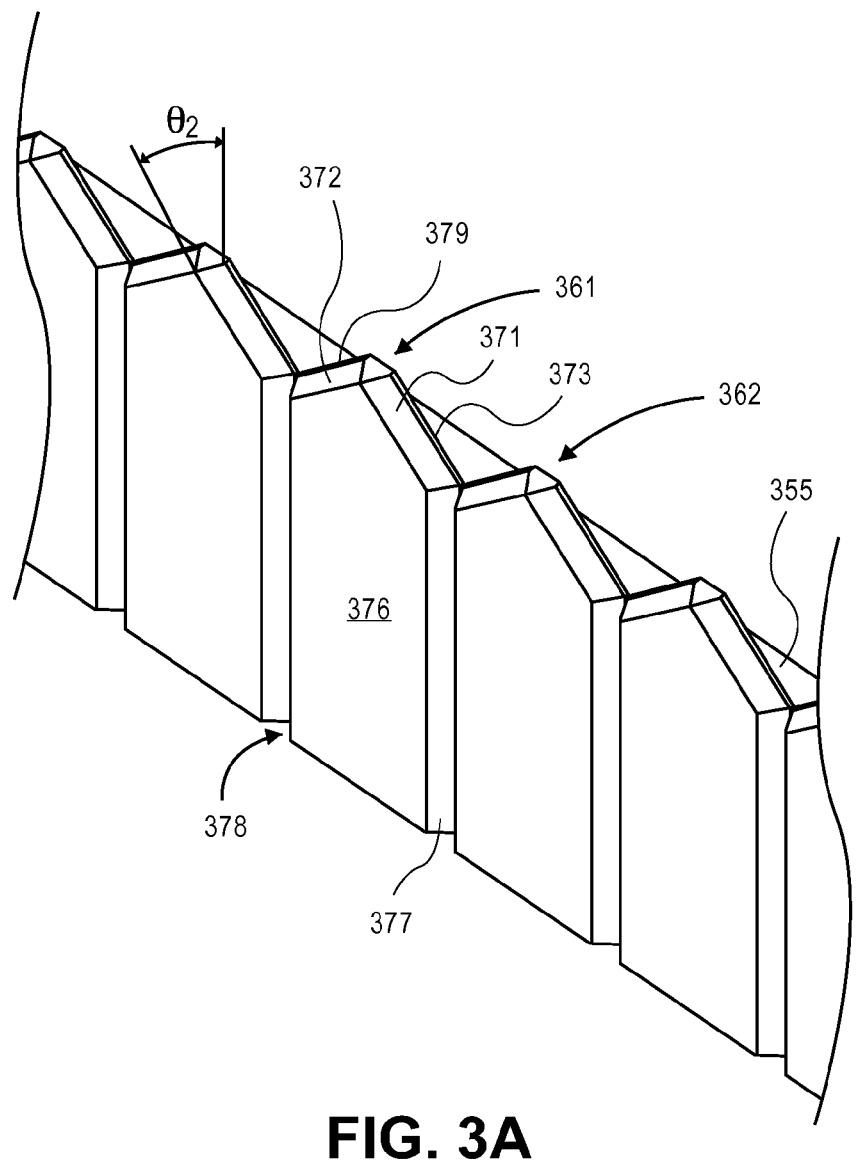
FIG. 3A is a perspective, dimetric view illustrating one side of a portion of a rail having a plurality of teeth in accordance with one embodiment of the present invention.
Figure 3B:
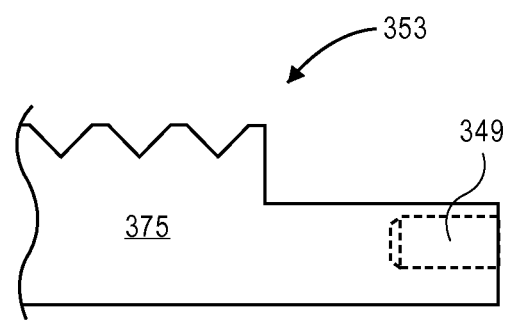
FIG. 3B illustrates the opposite side of the rail to that shown in FIG. 3A.

FIG. 3A is a perspective, dimetric view illustrating one side of a portion of a rail having a plurality of teeth in accordance with one embodiment of the present invention. FIG. 3B illustrates the opposite side of rail 353 to that shown in FIG. 3A. FIG. 3B also illustrates an end portion of rail 353 that is connected to one of the end plates of carrier 200. The rail may include a cavity 349 to receive a rod, bolt or other similar type of component for connection of the rail to an end plate.

In one particular embodiment, rail 353 represents bottom insert rail 253 of FIG. 2 or other rail situated between the 3 o'clock and 9 o'clock positions. Alternatively, rail 353 may be any one or more other rails (e.g., rails 251, 252, etc.) used to secure one or more disk within a nest of the carrier. Rail 353 has a plurality of teeth (e.g., teeth 361 and 362) and a support bar 355 to which the teeth are connected. The plurality of teeth and the support bar may be of a unitary construction or may be fabricated from separate components that are fashioned together using any means known in the art. In one embodiment, the plurality of teeth may be constructed of from a polymer, for example, polychlorotrifluoroethylene (PEEK). Alternatively, other materials may be used such as metals and ceramics. For ease of explanation, a description is provided for one of the teeth of rail 353. Additional teeth, such as tooth 362, may also be constructed in a manner similar to tooth 361.

Tooth 361 has a front surface 376, a back surface 375 (shown in FIG. 3B). Tooth 361 also has a first upper beveled edge surface 371, a second upper beveled edge surface 372, a first top, sloping flat surface 373, a second top, sloping flat surface 379, a peak, flat top surface 374 and two beveled side surfaces: 377 and 378 (shown in the FIG. 4). The surfaces 371 and 372 of the tooth 361 are beveled. As such, the front surface 376 and the top, sloping surfaces 373/379 are not at right angles to each other, as exists with the surfaces of the teeth illustrated in FIG. 1B. The beveling of surfaces 371 and 372 facilitates the run-off, or drainage, of liquid away from the top, sloping flat surfaces 373 and 372 that contact a disk and, thereby, reduce the trapping of liquid there that may otherwise stain the surface of the disk. Each of the upper beveled edge surfaces 371 and 372 are beveled at an angle in a range of 40 to 50 degrees from top, sloping flat surfaces 373 and 379, respectively. In one exemplary embodiment, the upper beveled edge surfaces 371 and 372 are beveled at an angle of 45 degrees. In the embodiment of the rail illustrated in FIG. 3A, the upper beveled edge surfaces 371 and 372 are chamfered. The chamfered surfaces connect the side surface 376 with the top sloping surfaces 373 and 379, respectively, with the side surface and top sloping surfaces being at right angles with respect to each other. It should be noted that the beveling of the surfaces may also be shaped differently than a tapered flat surface, for example, rounded (either concave or convex). Some exemplary dimensions of the teeth according to one embodiment of the present invention are discussed in relation to FIG. 4.

Figure 4:
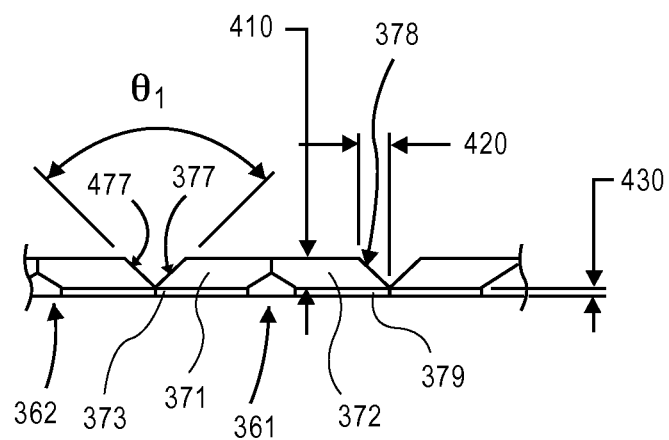
FIG. 4 is a top view illustrating the teeth of the rail according to one embodiment of the present invention.

FIG. 4 is a top view illustrating the teeth of the rail according to one embodiment of the present invention. A better view of the angle $\theta_1$, between the first and second beveled side surfaces may be found in FIG. 4. In one embodiment, the angle between the beveled side surfaces 377 and 477 of adjoining teeth 361 and 362, respectively, may be in a range of 80 to 100 degrees. In one exemplary embodiment, angle $\theta_1$, is approximately 90 degrees. In one exemplary embodiment, the upper beveled edge surfaces 371 and 372 have a width 410 of approximately 0.8 mm; the beveled side surfaces 377 and 378 have a width 420 of approximately 0.8 mm; and the top, sloping flat surfaces 373 and 379 have a width 430 of approximately 0.2 mm. Alternatively, the various sides and surfaces may have other dimensions.

Figure 5:
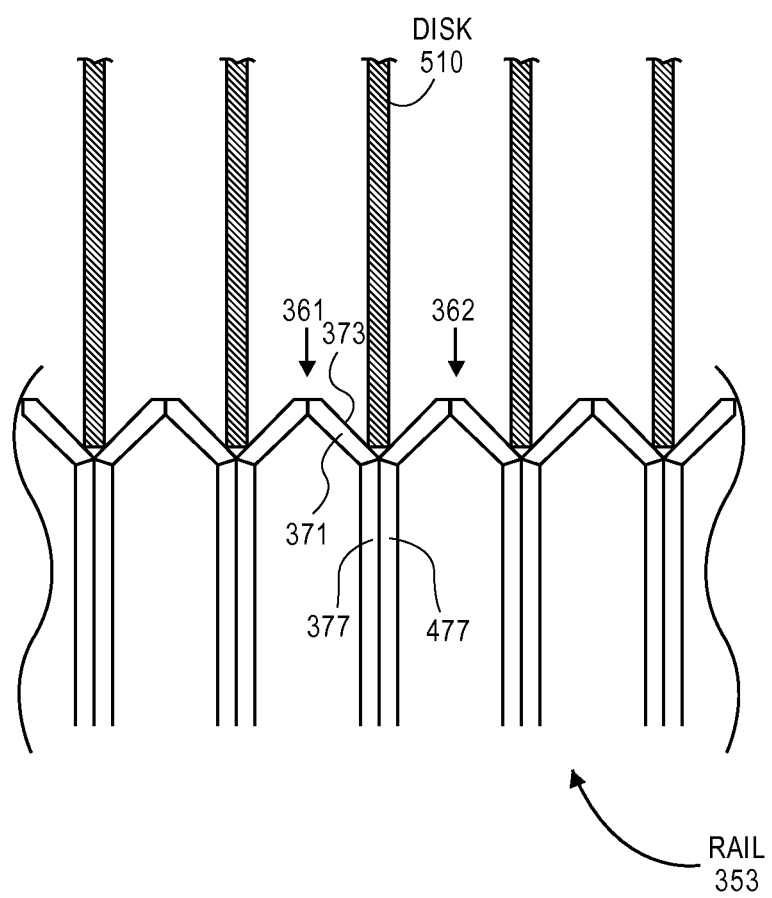
FIG. 5 illustrates a front view of a portion of a rail with disks (situated between teeth of the rail, according to one embodiment of the present invention.

FIG. 5 illustrates a front view of a portion of rail 353 with disks (e.g., disk 510) situated between teeth 361 and 362. The edges of disk 510 are in contact with the teeth's respective top, sloping flat surfaces (e.g., surface 373). The upper beveled edge surfaces 371 and the beveled side surface 377 of tooth 361 (and corresponding upper beveled edge surface and beveled side surface 477 of tooth 362) provide a channel to facilitate the run-off, or drainage, of liquid away from the top, sloping flat surfaces (e.g., 373) of the teeth that contact disk 510 and, thereby, reduce the trapping of liquid at the disk to teeth interface that may otherwise stain the surface of the disk.

It should be noted that the various beveled surfaces may be beveled at other angles that mentioned in the embodiments described above. Moreover, any approximated dimensions provided herein may be varied by +/−10-percent.

Although these embodiments have been described in language specific to structural features and methodological acts, it is to be understood that the invention defined in the appended claims is not necessarily limited to the specific features or acts described in particular embodiments. The specific features and acts disclosed are to be understood as particularly graceful implementations of the claimed invention in an effort to illustrate rather than limit the present invention.

What is claimed is:

1. A workpiece carrier, comprising:
a first nest, the first nest comprising:
first and second end plates;
a first side insert rail coupled between the first and second end plates;
a second side insert rail coupled between the first and second end plates; and
a bottom insert rail coupled between the first and second end plates, the bottom insert rail having a plurality of teeth, wherein each of the plurality of teeth has a top surface, a front surface and a first beveled upper edge surface, wherein the first sied insert rail, the second insert rail and the bottom insert rail are coupled between the first and second end plates in a non-parallel orientiation with respect to each other.

2. The workpiece carrier of claim 1, wherein the each of the plurality of teeth further has a second beveled upper edge surface, wherein the first and second beveled upper edge surfaces are chamfered surfaces, that connect the front surface and the top surface of the teeth, each having an angle in a range of 40 to 50 degrees to the top surface.

3. The workpiece carrier of claim 2, wherein each of the plurality of teeth has a first beveled side surface and a second beveled side surface and wherein each of the first and second beveled side surfaces is a chamfer at an angle in a range of 40 to 50 degrees to the front surface.

* * * * *